US011270653B2

(12) United States Patent
Kim et al.

(10) Patent No.: US 11,270,653 B2
(45) Date of Patent: Mar. 8, 2022

(54) DISPLAY DEVICE

(71) Applicant: Samsung Display Co., Ltd., Yongin-Si (KR)

(72) Inventors: Hyun Chang Kim, Yongin-si (KR); Sung Chun Park, Yongin-si (KR); Dong Kwan Han, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/161,489

(22) Filed: Jan. 28, 2021

(65) Prior Publication Data

US 2021/0375214 A1 Dec. 2, 2021

(30) Foreign Application Priority Data

May 27, 2020 (KR) ........................ 10-2020-0063574

(51) Int. Cl.
*G06F 1/00* (2006.01)
*G09G 3/3275* (2016.01)

(52) U.S. Cl.
CPC ....... *G09G 3/3275* (2013.01); *G09G 2310/08* (2013.01); *G09G 2320/0626* (2013.01); *G09G 2330/021* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 9,070,318 | B2 | 6/2015 | Hwang et al. | |
| 10,170,035 | B2 | 1/2019 | Park | |
| 10,319,310 | B2 | 6/2019 | Kim et al. | |
| 2013/0076648 | A1* | 3/2013 | Krah | G06F 3/04184 345/173 |
| 2015/0154903 | A1* | 6/2015 | Miura | G09G 3/2003 345/690 |
| 2018/0122299 | A1* | 5/2018 | Tsuchida | G09G 3/2059 |
| 2018/0190196 | A1* | 7/2018 | Kwon | G09G 3/3233 |
| 2019/0259325 | A1* | 8/2019 | Chaji | G09G 3/2003 |
| 2019/0355307 | A1 | 11/2019 | Nam et al. | |

FOREIGN PATENT DOCUMENTS

| | | | |
|---|---|---|---|
| KR | 10-2016-0020597 | A | 2/2016 |
| KR | 10-2017-0051612 | A | 5/2017 |
| KR | 10-2005496 | B1 | 10/2019 |
| KR | 10-2019-0133083 | A | 12/2019 |

* cited by examiner

*Primary Examiner* — Michael A Faragalla
(74) *Attorney, Agent, or Firm* — Innovation Counsel LLP

(57) ABSTRACT

A display device includes the following elements: a display panel comprising pixels; a data driver supplying data signals to the plurality of pixels; a driving voltage supply supplying a first driving voltage to the data driver; a power supply supplying a first input driving voltage to the driving voltage supply; and a timing controller providing control signals to the data driver, the driving voltage supply, and the power supply and providing luminance information and per-second frame rate information of the display panel to the driving voltage supply. The driving voltage supply comprises an input driving voltage adjuster which adjusts the first input driving voltage to a second input driving voltage based on the luminance information and the per-second frame rate information.

20 Claims, 12 Drawing Sheets

FIG. 5

| Frame Rate | | | |
|---|---|---|---|
| 120 Hz | 0.1 | 0.05 | 0 |
| 90 Hz | 0.15 | 0.1 | 0.05 |
| 60 Hz | 0.3 | 0.2 | 0.1 |
| LUMINANCE (DBV) | 100 nit | 650 nit | 1200 nit |

FIG. 8A

| Frame Rate | | | |
|---|---|---|---|
| 120 Hz | 0.2 | 0.05 | 0 |
| 90 Hz | 0.21 | 0.2 | 0.05 |
| 60 Hz | 0.325 | 0.225 | 0.2 |
| LUMINANCE (DBV) | 100 nit | 650 nit | 1200 nit |

FIG. 8B

| Frame Rate | 100 nit | 650 nit | 1200 nit |
|---|---|---|---|
| 120 Hz | 0.225 | 0.1 | 0 |
| 90 Hz | 0.23 | 0.225 | 0.1 |
| 60 Hz | 0.35 | 0.25 | 0.225 |

LUMINANCE (DBV)

DISPLAY DEVICE

CROSS-REFERENCE TO RELATED APPLICATION

This application claims priority under 35 U.S.C. § 119 to Korean Patent Application No. 10-2020-0063574, filed in the Korean Intellectual Property Office on May 27, 2020; the Korean Patent Application is incorporated by reference.

TECHNICAL FIELD

The technical field generally relates to a display device.

DISCUSSION OF RELATED ART

A display device may display images according to input signals. Examples of display devices include liquid crystal display devices and organic light emitting display devices.

A display device typically includes a display panel, a scan driver, and a data driver. The display panel includes scan lines, data lines, and pixels. The scan driver sequentially provides scan signals to the pixels through the scan lines. The data driver provides data signals to the pixels through the data lines. Each of the pixels emits light with a luminance corresponding to a received data signal.

The data driver and the scan driver receive driving voltages for providing the data signals and the scan signals. Power consumption of the display device may be high when the driving voltages are high.

SUMMARY

Embodiments may be related to a driving voltage supply capable of minimizing power consumption and/or a display device including the driving voltage supply.

An embodiment may be related to a display device that includes the following elements: a display panel including a plurality of pixels; a data driver which supplies a data signal to the plurality of pixels; a driving voltage supply which supplies a first driving voltage to the data driver; a power supply which supplies a first input driving voltage to the driving voltage supply; and a timing controller which provides a plurality of control signals for respectively controlling the data driver, the driving voltage supply, and the power supply, and provide the driving voltage supply with luminance information and per-second frame rate information of the display panel.

The driving voltage supply may include an input driving voltage corrector which corrects the first input driving voltage to a second input driving voltage as a difference voltage between the first input driving voltage and an offset voltage, and the offset voltage may be determined based on the luminance information and the per-second frame rate information of the display panel.

The offset voltage may have a voltage level which decreases when a luminance value and/or a per-second frame rate of the display panel increases.

The input driving voltage corrector may include: a luminance controller which outputs a luminance value of the display panel, based on the luminance information of the display panel; an offset calculator which calculates the offset voltage, based on the luminance value and the per-second frame rate; and a subtractor which subtracts the offset voltage from the first input driving voltage.

The input driving voltage corrector may further include an interface unit for communicating with the power supply, and the interface unit is any one of an inter-integrated circuit and a single wire.

The offset calculator may include a first lookup table, and the first lookup table may include a plurality of first offset voltages including the offset voltage, which determine a voltage margin of the second input driving voltage according to a relationship between the luminance value and the per-second frame rate.

The plurality of first offset voltages may have a voltage level which decreases as the per-second frame rate increases, when the luminance value is constant, and have a voltage level which decreases as the luminance value increases, when the per-second frame rate is constant.

The timing controller may further provide image pattern information of the display panel to the driving voltage supply.

The image pattern information may include image information on a zebra pattern (1 line H-strip) in which white and black are alternately displayed for each pixel row of the display panel, a blue pattern in which the whole of the display panel is displayed with blue, and a white pattern in which the whole of the display panel is displayed with white.

The input driving voltage corrector may further include an image pattern analyzer which outputs an image pattern current value consumed in the display panel, based on the image pattern information of the display panel.

The offset calculator may further include a plurality of second lookup tables, and the plurality of second lookup tables may include a plurality of second offset voltages including the offset voltage, which determine a voltage margin of the second input driving voltage according to a relationship between the luminance value and the per-second frame rate for each image pattern current value.

The plurality of second offset voltages may have a voltage level which decreases as the per-second frame rate increases, when the luminance value is constant, and have a voltage level which decreases as the luminance value increases, when the per-second frame rate is constant.

The plurality of second lookup tables may include a second lookup table for the zebra pattern, a second lookup table for the blue pattern, and a second lookup table for the white pattern. When the luminance value and the per-second frame rate of the display panel are the same, a magnitude of second offset voltages included in the second lookup table for the zebra pattern may be smaller than that of second offset voltages included in the second lookup table for the blue pattern, and the magnitude of the second offset voltages included in the second lookup table for the blue pattern may be smaller than that of second offset voltages included in the second lookup table for the white pattern.

The driving voltage supply may further include a plurality of regulators which receive the second input driving voltage, and generate the first driving voltage by dividing the second input driving voltage.

The plurality of regulators may be low-dropout regulators.

The first driving voltage may include a first gamma voltage as a highest gamma voltage and a second gamma voltage as a lowest gamma voltage.

The data driver may include a gamma block which receives the first gamma voltage and the second gamma voltage, and generates a plurality of gamma voltages by dividing the first gamma voltage and the second gamma voltage.

The display device may further include a scan driver which supplies a scan signal to the plurality of pixels.

The power supply may supply a second driving voltage to the scan driver. The plurality of regulators may generate the second driving voltage by dividing the second input driving voltage.

The second driving voltage may include a high DC voltage and a low DC voltage, which are used when the pixels are turned on/off.

The power supply may further include a boost DC-DC converter which receives an external power voltage, and boosts the external power voltage to the first input driving voltage having a level higher than that of the external power voltage.

An embodiment may be related to a display device. The display device may include a display panel, a data driver, a driving voltage supply, a power supply, and timing controller. The display panel may include pixels. The data driver may be electrically connected to the pixels and may supply data signals to the pixels. The driving voltage supply may be electrically connected to the data driver and may supply a first driving voltage to the data driver. The power supply may be electrically connected to the driving voltage supply and may supply a first input driving voltage to the driving voltage supply. The timing controller may provide control signals for respectively controlling the data driver, the driving voltage supply, and the power supply and may provide the driving voltage supply with luminance information and per-second frame rate information of the display panel. The driving voltage supply may include an input driving voltage adjuster. The input driving voltage adjuster may be electrically connected to the timing controller, may determine an offset voltage based on the luminance information and the per-second frame rate information of the display panel, and may use the first input driving voltage and the offset voltage to generate a second input driving voltage.

The input driving voltage adjuster may decrease a voltage level of the offset voltage when at least one of a luminance value of the display panel and a per-second frame rate of the display panel increase.

The input driving voltage adjuster may include the following elements: a luminance controller, which may output the luminance value of the display panel based on the luminance information of the display panel; an offset determiner, which may determine the offset voltage based on the luminance value of the display panel and the per-second frame rate of the display panel; and a subtractor, which may subtract the offset voltage from the first input driving voltage to generate at least one of an adjusted input driving voltage and the second input driving voltage.

The input driving voltage adjuster may include an interface unit electrically connected to the power supply for communicating with the power supply. The interface unit may include at least one of an inter-integrated circuit and a single wire.

The offset determiner may include a first lookup table. The first lookup table may include first-set values for the offset voltage corresponding to possible values of the luminance value of the display panel and corresponding to possible values of the per-second frame rate of the display panel.

According to the first lookup table, for a same possible value of the luminance value, a first first-set value for the offset voltage may correspond to a first possible value of the per-second frame rate, and a second first-set value for the offset voltage lower than the first first-set value for the offset voltage may correspond to a second possible value of the per-second frame rate higher than the first possible value of the per-second frame rate.

According to the first lookup table, for a same possible value of the per-second frame rate, a third first-set value for the offset voltage may correspond to a first possible value of the luminance value, and a fourth first-set value for the offset voltage lower than the third first-set value for the offset voltage may correspond to a second possible value of the luminance value higher than the first possible value of the luminance value.

The timing controller may further provide image pattern information of the display panel to the driving voltage supply.

The image pattern information indicates a zebra pattern when pixel rows of the display panel may alternately display white and black. The image pattern information indicates a blue pattern when all available pixels of the display panel may display blue. The image pattern information indicates a white pattern when all the available pixels of the display panel may display white.

The input driving voltage adjuster may include an image pattern analyzer, which may output an image pattern current value of a current consumed in the display panel based on the image pattern information of the display panel.

The offset determiner may use the first lookup table to determine the offset voltage when the image pattern information indicates a first image pattern. The offset determiner may include a second lookup table and may use the second lookup table to determine the offset voltage when the image pattern information indicates a second image pattern. The first image pattern and the second image pattern may be different two of the zebra pattern, the blue pattern, and the white pattern. The second lookup table may include second-set values for the offset voltage corresponding to the possible values of the luminance value and corresponding to the possible values of the per-second frame rate.

According to the second lookup table, for the same possible value of the luminance value, a first second-set value for the offset voltage may correspond to the first possible value of the per-second frame rate, and a second second-set value for the offset voltage lower than the first second-set value for the offset voltage may correspond to the second possible value of the per-second frame rate higher than the first possible value of the per-second frame rate.

According to the second lookup table, for the same possible value of the per-second frame rate, a third second-set value for the offset voltage may correspond to the first possible value of the luminance value, and a fourth second-set value for the offset voltage lower than the third second-set value for the offset voltage may correspond to the second possible value of the luminance value higher than the first possible value of the luminance value.

The first image pattern may be the zebra pattern or the blue pattern. The second image pattern may be the blue pattern or the white pattern. The first first-set value and the second first-set value for the offset voltage may be respectively lower than the first second-set value and the second second-set value for the offset voltage. The third first-set value and the fourth first-set value for the offset voltage may be respectively lower than the third second-set value and the fourth second-set value for the offset voltage.

The driving voltage supply may include regulators, which may receive the second input driving voltage and may generate the first driving voltage by dividing the second input driving voltage.

The regulators may be low-dropout regulators.

The first driving voltage may include a first gamma voltage as a highest gamma voltage for the display panel and may include a second gamma voltage as a lowest gamma voltage for the display panel.

The data driver may include a gamma block, which may receive the first gamma voltage and the second gamma voltage and may generate gamma voltages by dividing the first gamma voltage and the second gamma voltage.

The display device may include a scan driver supplying scan signals to the pixels.

The regulators may generate a second driving voltage by dividing the second input driving voltage and may provide the second driving voltage to the scan driver.

The second driving voltage may include a high DC voltage and a low DC voltage, which may be used when the pixels are turned on or turned off.

The power supply may include a boost DC-DC converter, which may receive an external power voltage and may boost the external power voltage to the first input driving voltage having a level higher than that of the external power voltage.

BRIEF DESCRIPTION OF THE DRAWINGS

FIG. 5 is a diagram illustrating a lookup table of an input driving voltage offset calculator in accordance with an embodiment.

FIG. 8A is a diagram illustrating a lookup table of an input driving voltage offset calculator in accordance with an embodiment.

FIG. 8B is a diagram illustrating a lookup table of an input driving voltage offset calculator in accordance with an embodiment.

DETAILED DESCRIPTION

Figure 1:
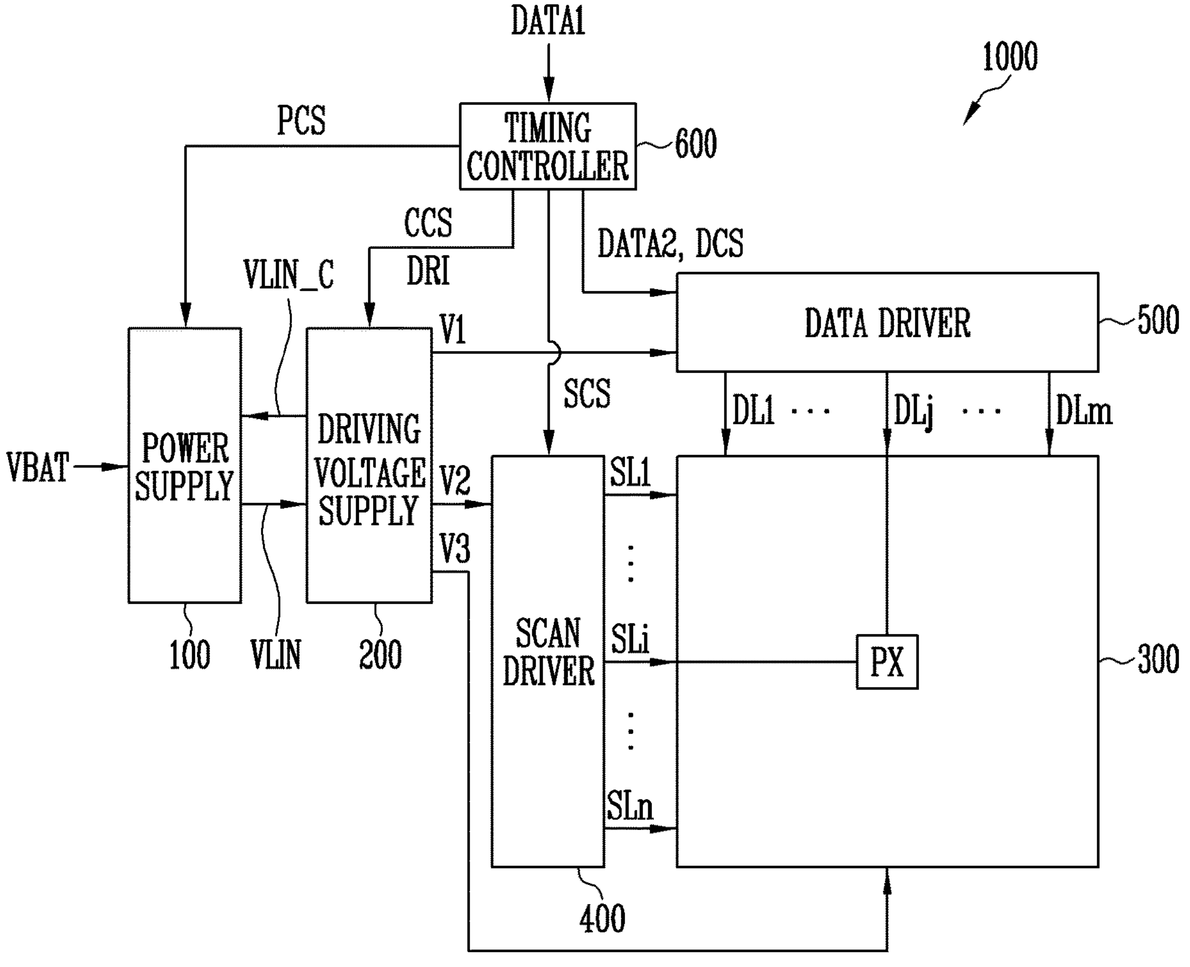
FIG. 1 is a schematic block diagram illustrating a display device in accordance with embodiments.

Example embodiments are described with reference to the accompanying drawings. In the drawings, the same reference numerals may be given to the same elements, and related descriptions may not be repeated.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

The term "connect" may mean "electrically connect" or "electrically connected through no intervening transistor." The term "drive" may mean "operate" or "control." The term "correct" may mean "adjust." The term "correction" may mean "adjustment." The term "corrector" may mean "adjuster." The term "correspond to" may mean "include" or "be." The term "calculate" may mean "determine." The term "voltage" may mean "voltage set" or "set of voltages." Signals, voltages, information, etc. illustrated in the drawings may be transmitted through electrical connections.

Figure 2:
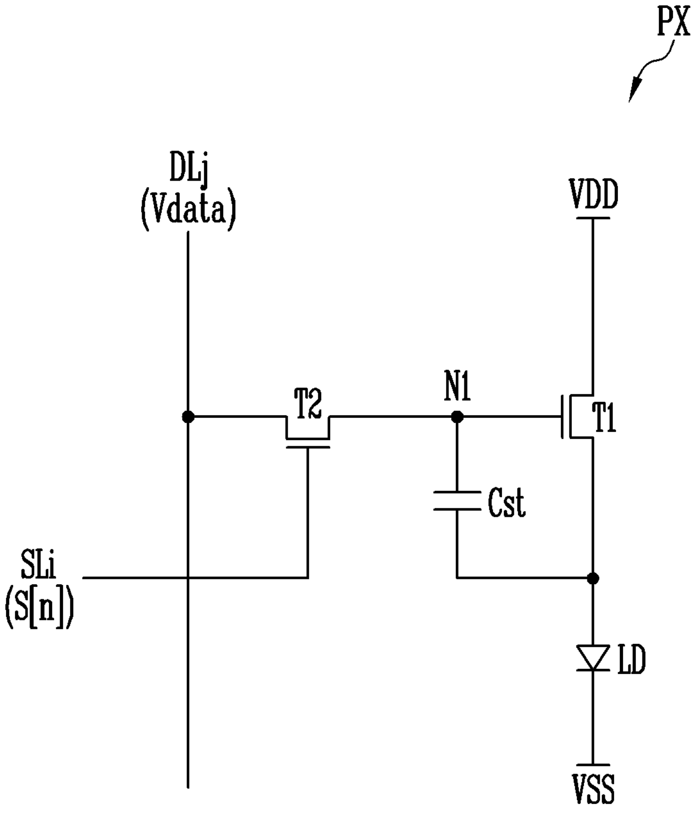
FIG. 2 is a schematic circuit diagram illustrating a pixel included in the display device shown in FIG. 1 in accordance with embodiments.
Figure 3:
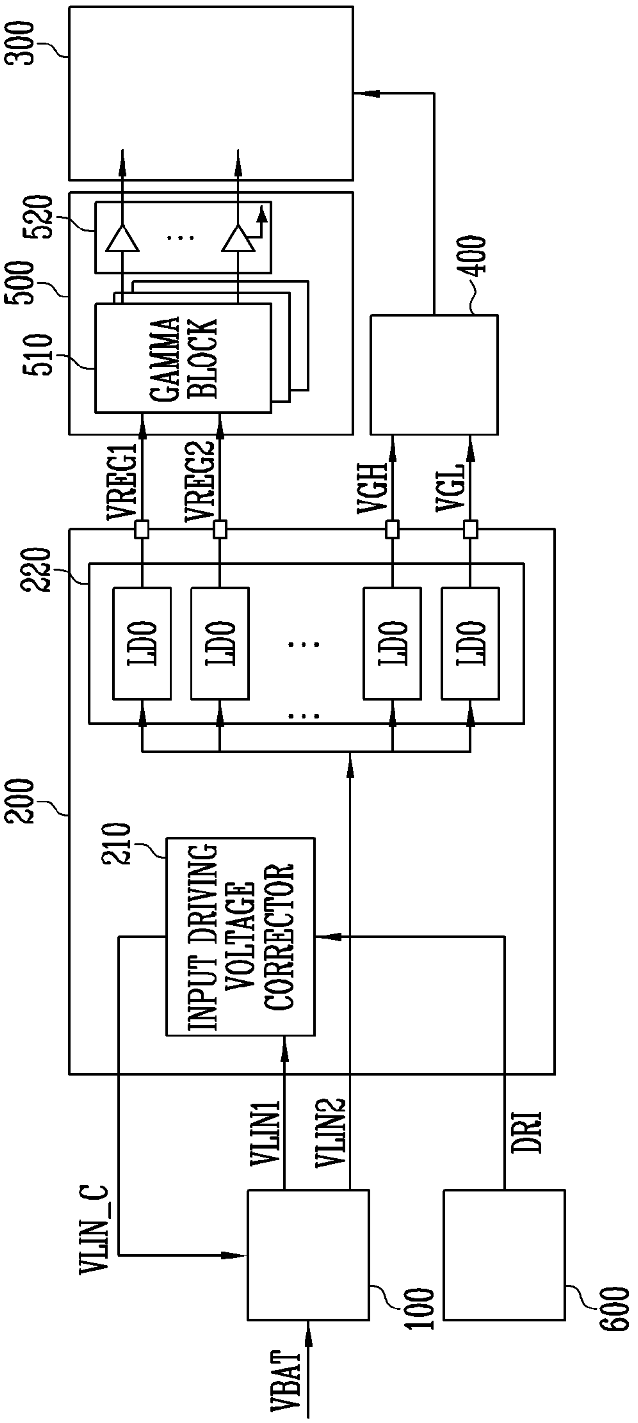
FIG. 3 is a schematic block diagram illustrating a driving voltage supply in accordance with embodiments.

FIG. 1 is a schematic block diagram illustrating a display device in accordance with embodiments of the present disclosure. FIG. 2 is a schematic circuit diagram illustrating a pixel included in the display device shown in FIG. 1 in accordance with embodiments. FIG. 3 is a schematic block diagram illustrating a driving voltage supply in accordance with embodiments.

Referring to FIG. 1, the display device 1000 may include a power supply 100, a driving voltage supply 200, a display panel 300, a scan driver 400, a data driver 500, and a timing controller 600.

The power supply 100 may include a boost DC-DC converter (not shown) which receives an external power voltage VBAT. Based on a power supply control signal PCS, the power supply 100 and/or the boost DC-DC converter converts the external power voltage VBAT into an input driving voltage VLIN having a level higher than that of the external power voltage VBAT. For example, the external power voltage VBAT may be in a range of about 2.5 V to 4.9 V, and the input driving voltage VLIN may be about 7.8 V. The input driving voltage VLIN may be a highest voltage output from the power supply 100. In accordance with an embodiment, the external power voltage VBAT may be supplied from a battery (not shown) included in the display device 1000.

The driving voltage supply 200 (or driving power supply 200) may receive the input driving voltage VLIN from the power supply 100, and may provide a third driving voltage V3, a second driving voltage V2, and a first driving voltage V1 respectively to the display panel 300, the scan driver 400, and the data driver 500 by dividing the input driving voltage VLIN.

The driving voltage supply 200 may include a plurality of regulators 220 (see FIG. 3) which regulate the input driving voltage VLIN to the driving voltages V1, V2, and V3.

Referring to FIG. 1, FIG. 2, and FIG. 3, the first driving voltage V1 may include and/or correspond to a first gamma voltage VREG1 and a second gamma voltage VREG2, which are necessary for driving of the data driver 500; the second driving voltage V2 may include and/or correspond to a high DC voltage VGH and a low DC voltage VGL, which are the minimum required voltages necessary for driving of the scan driver 400; and the third driving voltage V3 may include and/or correspond to a first power voltage VDD, a second power voltage VSS, and the like, which are necessary for an operation of a pixel PX included in the display panel 300.

The driving voltage supply 200 may further include an input driving voltage corrector 210 (see FIG. 3). The input driving voltage corrector 210 may provide the power supply 100 with a driving voltage correction signal VLIN_C which allows the input driving voltage VLIN to be corrected based on driving information DRI received from the timing controller 600.

The display panel 300 may include a plurality of scan lines SL1 to SLn and a plurality of data lines DL1 to DLm. The display panel 300 may include a plurality of pixels PX connected to the scan lines SL1 to SLn and the data lines DL1 to DLm (n and m are integers greater than 1). Each of the pixels PX may include a driving transistor and a plurality of switching transistors.

A pixel PX may include pixels (or subpixels) which emit lights of different colors. For example, a first pixel may emit light of a first color (e.g., red), a second pixel may emit light of a second color (e.g., green), and a third pixel may emit light of a third color (e.g., blue).

A pixel PX may emit light with a luminance corresponding to a data signal provided through a data line (e.g., a jth data line DLj) in response to a scan signal (or gate signal) provided through a scan line (e.g., an ith scan line SLi).

The power voltages VDD and VSS may be provided to the display panel 300. The power voltages VDD and VSS are voltages necessary for an operation of the pixel PX, and the first power voltage VDD may have a voltage level higher than that of the second power voltage VSS. The power voltages VDD and VSS may be provided to the display panel 300 from the driving voltage supply 200.

The scan driver 400 may sequentially supply scan signals to the pixels PX through the scan lines SL1 to SLn, based on a scan control signal SCS. The scan driver 400 may receive the scan control signal SCS, at least one clock signal, and the like from the timing controller 600.

A scan signal supplied to one scan line in one frame period may be/include at least one pulse.

The scan signal may be a gate-on voltage at which a transistor included in a pixel PX is turned on. For example, when the transistor included in the pixel PX is implemented with a P-channel metal oxide semiconductor (PMOS) transistor, the gate-on voltage may be set as a logic low level (or the low DC voltage VGL). When the transistor included in the pixel PX is implemented with an N-channel metal oxide semiconductor (NMOS) transistor, the gate-on voltage may be set as a logic high level (or the high DC voltage VGH). The high DC voltage VGH and/or the low DC voltage VGL may be supplied to the scan driver 400 from the driving voltage supply 200.

The scan driver 400 may include stages dependently connected to each other to sequentially output scan signals to the scan lines SL1 to SLn.

The data driver 500 may receive a data control signal DCS and second image data DATA2 from the timing controller 600. The data driver 500 may supply data signal (or data voltages) to the pixels PX through the data lines DL1 to DLm, based on the data control signal DCS and the second image data DATA2. The data driver 500 may supply a data signal corresponding to a grayscale of an image to one or more of the data lines DL1 to DLm. A data signal may be supplied to a corresponding pixel PX in synchronization with a scan signal.

The timing controller 600 may generate a data control signal DCS and a scan control signal SCS, corresponding to synchronization signals (supplied from an external component/device). The data control signal DCS may be supplied to the data driver 500, and the scan control signal SCS may be supplied to the scan driver 400.

The timing controller 600 may supply compensated second image data DATA2 to the data driver 500, based on first image data DATA1. The first image data DATA1 and the compensated second image data DATA2 may include grayscale information within a grayscale range set in the display device.

Figure 4:
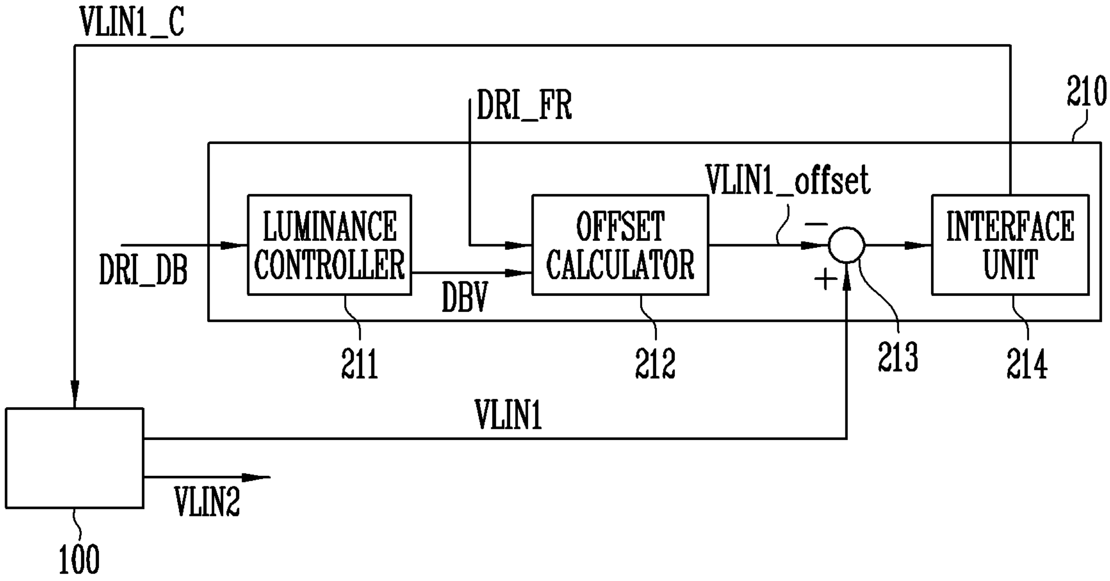
FIG. 4 is a schematic block diagram illustrating an input driving voltage corrector in accordance with an embodiment.

The timing controller 600 may provide driving information DRI to the driving voltage supply 200. Referring to FIG. 4 and/or FIG. 7, the driving information DRI may include luminance information DRI_DB of the display panel 300, per-second frame rate information DRI_FR of the display panel 300, and/or image pattern information DRI_IP of the display panel 300.

FIG. 2 is a schematic circuit diagram illustrating a pixel included in the display device shown in FIG. 1.

Referring to FIGS. 1 and 2, the pixel PX may include a light emitting device LD, a first transistor T1 (driving transistor), a second transistor T2, and a storage capacitor Cst.

An anode electrode of the light emitting device LD may be connected to a second electrode of the first transistor T1, and a cathode electrode of the light emitting device LD may be connected to the second power voltage VSS. The light emitting device LD may emit light with a luminance corresponding to an amount of current supplied from the first transistor T1. The light emitting device LD may be configured as an organic light emitting device or an inorganic light emitting device such as a micro light emitting diode (LED) or a quantum dot LED. The light emitting device LD may be a light emitting device complexly configured with an organic material and an inorganic material.

A first electrode of the first transistor T1 may be connected to the first power voltage VDD, and the second electrode of the first transistor T1 may be connected to the anode electrode of the light emitting device LD. A gate electrode of the first transistor T1 may be connected to a first node N1. The first transistor T1 may control an amount of current flowing through the light emitting device LD, corresponding to a voltage of the first node N1.

A first electrode of the second transistor T2 may be connected to a data line DLj, and a second electrode of the second transistor T2 may be connected to the first node N1. A gate electrode of the second transistor T2 may be connected to a scan line SLi. The second transistor T2 may be turned on when a scan signal S[n] is supplied to the scan line SLi, to transfer a data signal Vdata from the data line DLj to the first node N1.

The storage capacitor Cst may be connected between the first node N1 and the anode electrode of the light emitting device LD. The storage capacitor Cst may store the voltage of the first node N1.

Although a case where the first transistor T1 and the second transistor T2 are implemented with an N-type transistor is illustrated in FIG. 2, this is merely illustrative, and the present disclosure is not limited thereto. For example, the first transistor T1 and the second transistor T2 may be implemented with a P-type transistor. In addition, the circuit structure of the pixel PX shown in FIG. 2 is merely illustrative, and the pixel PX is not limited thereto. For example, the pixel PX may further include a circuit element (e.g., a sensing transistor connected to the anode electrode of the light emitting device LD and a separate sensing line) for measuring a light emission characteristic of the light emitting device LD and/or a threshold voltage of the first transistor T1.

FIG. 3 is a schematic block diagram illustrating a driving voltage supply in accordance with embodiments.

Referring to FIGS. 1 and 3, the driving voltage supply 200 may include an input driving voltage corrector 210 (or input driving voltage adjuster 210) and regulators 220.

The input driving voltage corrector 210 may receive a first input driving voltage VLIN1 from the power supply 100. The input driving voltage corrector 210 may receive driving information DRI and a driving voltage control signal CCS from the timing controller 600.

The input driving corrector 210 may provide the power supply 100 with a driving voltage correction signal VLIN_C for correcting the first input driving voltage VLIN1 to a second input driving voltage VLIN2, based on the driving information DRI. For example, the input driving voltage corrector 210 may provide the driving voltage correction signal VLIN_C to the power supply 100 when a luminance of the display panel 300 and a per-second frame number (i.e., a frame rate) are changed.

The regulators 220 may receive a second input driving voltage VLIN2 from the power supply 100. The regulators 220 may regulate the second input driving voltage VLIN2 to provide driving voltages respectively corresponding to the scan driver 400, the data driver 500, and the like. The regulators 220 may be low-dropout (LDO) regulators.

Some of the regulators 220 may generate a first gamma voltage VREG1 (or highest gamma voltage) and a second gamma voltage VREG2 (or lowest gamma voltage), which are used to generate gamma voltages, based on the second input driving voltage VLIN2, and may provide the first gamma voltage VREG1 and the second gamma voltage VREG2 to a gamma block 510 in the data driver 500.

Although not shown in the drawing, the gamma block 510 may include a plurality of resistors connected in series, to generate a plurality of gamma voltages by dividing the first gamma voltage VREG1 and the second gamma voltage VREG2 through the resistors. A number of the plurality of gamma voltages may depend on the configuration of a resistor string (R-string).

Some of the regulators 220 may generate a high DC voltage VGH and a low DC voltage VGL, which are used to drive the scan driver 400, based on the second input driving voltage VLIN2. The high DC voltage VGH and the low DC voltage VGL may be applied to one or more level shifters included in the scan driver 400.

Although not shown in the drawing, some of the regulator 220 may generate a first power voltage VDD and a second power voltage VSS, which are provided to the display panel 300.

The second input driving voltage VLIN2 may correspond to a voltage for driving output buffers 520 included in the data driver 500. Although not shown in the drawing, the second input driving voltage VLIN2 may be separately applied to the output buffers 520 of the data driver 500. Each of the output buffers 520 may be/include an operational amplifier (OP-AMP).

FIG. 4 is a schematic block diagram illustrating an input driving voltage corrector/adjuster in accordance with an embodiment. FIG. 5 is a diagram illustrating a lookup table of an input driving voltage offset calculator in accordance with an embodiment.

Referring to FIG. 4, the input driving voltage corrector 210 may include a luminance controller 211, an offset calculator 212, a subtractor 213, and an interface unit 214.

The input driving voltage corrector 210 may receive driving information DRI from the timing controller 600. The driving information DRI may include luminance information DRI_DB of the display panel 300, per-second frame rate information DRI_FR of the display panel 300, and the like.

The luminance controller 211 may receive the luminance information DRI_DB from the timing controller 600, and output a luminance value DBV of the display panel 300.

The offset calculator 212 may receive the luminance value DBV of the display panel 300 from the luminance controller 211, and may receive the per-second frame rate information DRI_FR of the display panel 300 (e.g., a per-second frame rate value) from the timing controller 600. The offset calculator 212 may calculate/determine one offset voltage VLIN1_offset using the luminance value DBV and the per-second frame rate value. The offset calculator 212 may include a lookup table.

Referring to FIG. 4 and FIG. 5, the lookup table may include a plurality of offset voltages VLIN1_offset for determining a voltage margin of the second input driving voltage VLIN2 according to a relationship between the luminance value DBV and the per-second frame rate value of the display panel 300. The voltage margin may be defined as a voltage difference between the high DC voltage VGH and the first input driving voltage VLIN1. For example, when the high DC voltage VGH is about 7.2 V and the first input driving voltage VLIN1 is about 7.8 V, the voltage margin may be about 0.6 V.

For a highest luminance value DBV and a highest per-second frame rate, a voltage margin (e.g., 0.6 V) substantially equal to a predetermined reference voltage margin (e.g., 0.6 V) may be required. Therefore, according to the lookup table shown in FIG. 5, the offset voltage VLIN1_offset is 0 V (i.e., 0.6 V minus 0.6 V). For a lowest luminance value DBV and a lowest per-second frame rate, a voltage margin (e.g., 0.3 V) lower than the reference voltage margin (e.g., 0.6 V) is required; according the lookup table, the offset voltage VLIN1_offset may be increased as 0.3 V (i.e., 0.6 V minus 0.3 V). Driving of the display device is to be performed with a decreased offset voltage as the luminance value DBV of the display panel 300 and the per-second frame rate increase. Driving of the display device is to be performed with an increased offset voltage as the luminance value DBV of the display panel 300 and the per-second frame rate decrease.

Table 1 shows electric current ranges (representing electric energy consumption) of the display panel 300 according to luminance values and per-second frame rate values. Referring to Table 1, when the luminance of the display panel 300 and the per-second frame rate increase, the electric current range (and the electric energy consumption) of the display panel 300 increases due to an increase in the electric energy consumption of the data driver 500. Therefore, when the luminance and the per-second frame rate of the display panel 300 increase, the first input driving voltage VLIN1 requires a large voltage margin.

TABLE 1

| Per-second frame rate [Hz] | Luminance [nits] | Current maximum value [mA] | Current range [mA] |
|---|---|---|---|
| 60 | 100 | 44 | 21.6~44 |
| | 650 | 54.5 | 21.6~54.5 |
| | 1200 | 59.4 | 21.6~59.4 |
| 90 | 1200 | 85 | 30~85 |
| 120 | 1200 | 110 | 40~110 |

The lookup table shown in FIG. 5 is illustrative. The lookup table may be established by measuring power consumption of the display panel 300 according to the luminance and the per-second frame rate of the display panel 300.

Referring back to FIG. 4, the subtractor 213 may receive an offset voltage VLIN1_offset from the offset calculator 212 and may receive the first input driving voltage VLIN1 from the power supply 100. The subtractor 213 may generate a corrected/adjusted voltage value VLIN1_C by subtracting the offset voltage VLIN1_offset from the first input driving voltage VLIN1.

The interface unit 214 may receive the corrected voltage value VLIN1_C from the subtractor 213 and may provide the corrected voltage value VLIN1_C to the power supply 100. The interface unit 214 may transmit the corrected voltage value VLIN1_C to the power supply 100 through an Inter-Integrated Circuit ($I^2C$) interface. The interface unit 214 may transmit the corrected voltage value VLIN1_C to the power supply 100 through a single wire (SWIRE).

The power supply 100 may output a second input driving voltage VLIN2 using the corrected voltage value VLIN1_C. The second input driving voltage VLIN2 may be a function of the corrected/adjusted voltage value VLIN1_C. The second input driving voltage VLIN2 may be equal to the corrected/adjusted voltage value VLIN1_C, i.e., VLIN2=VLIN1_C=VLIN1−VLIN1_offset.

Figure 6A:
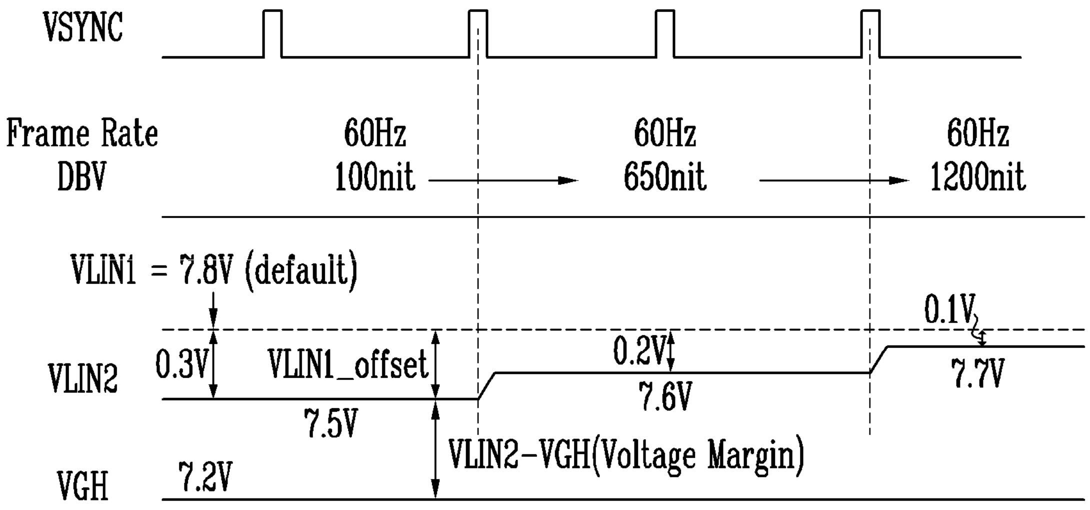
FIG. 6A, FIG. 6B, and FIG. 6C are diagrams illustrating operations of a display device in accordance with an embodiment.
Figure 6B:
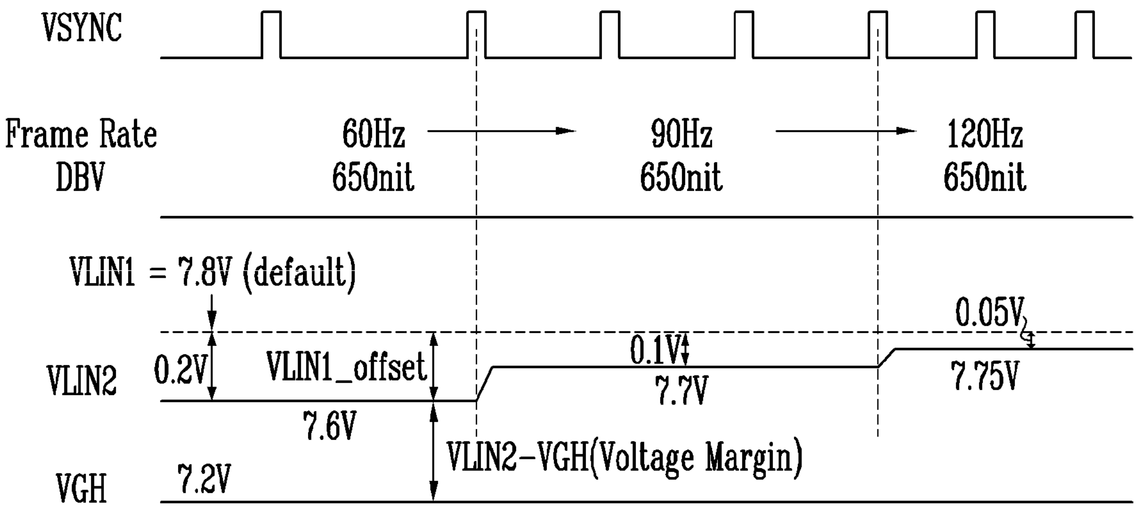
Figure 6C:
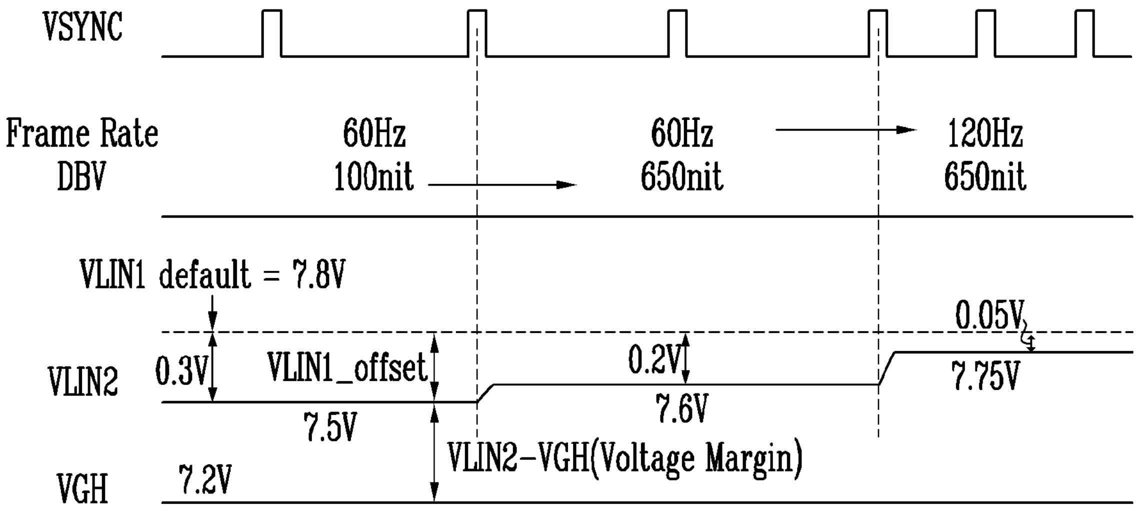

FIGS. 6A, 6B, and 6C are diagrams illustrating operations of the driving voltage supply shown in FIG. 3 in accordance with an embodiment. A per-second frame rate may be determined by a pulse period of a vertical synchronization signal VSYNC.

Referring to FIGS. 5 and 6A, when the luminance increases at the same per-second frame rate, the offset voltage VLIN1_offset decreases. For example, when the luminance increases to 100 nits, 650 nits, and 1200 nits when the per-second frame rate is maintained at 60 Hz, the offset voltage VLIN1_offset may decrease to 0.3 V, 0.2 V, and 0.1 V. In other words, when the luminance increases to 100 nits, 650 nits, and 1200 nits, the second input driving voltage VLIN2 may increase to 7.5 V, 7.6 V, and 7.7 V. This is because a large voltage margin is required (and the electric energy consumption of the data driver 500 increases) when the luminance of the display panel 300 increases.

Referring to FIGS. 5 and 6B, when the per-second frame rate increases at the same luminance level, the offset voltage VLIN1_offset decreases. For example, when the per-second frame rate increases to 60 Hz, 90 Hz, and 120 Hz when the luminance is maintained at 650 nits, the offset voltage VLIN1_offset may decrease to 0.2 V, 0.1 V, and 0.05 V. In other words, when the per-second frame rate increases to 60 Hz, 90 Hz, and 120 Hz, the second input driving voltage VLIN2 may increase to 7.6 V, 7.7 V, and 7.75 V. This is because a large voltage margin is required (and the electric energy consumption of the data driver 500 increases) when the per-second frame rate increases.

Referring to FIGS. 5 and 6C, when the luminance and/or the per-second frame rate increases, the offset voltage VLIN1_offset decreases. For example, when the per-second frame rate is maintained at 60 Hz, and when the luminance is changed from 100 nits to 650 nits, the offset voltage VLIN1_offset may decrease from 0.3 V to 0.2 V, and the second input driving voltage VLIN2 increases from 7.5 V to 7.6 V. When the per-second frame rate is changed from 60 Hz to 120 Hz, and when the luminance is maintained at 650 nits, the offset voltage VLIN1_offset may decrease from 0.2 V to 0.05 V, and the second input driving voltage VLIN2 increases from 7.6 V to 7.75 V. This is because a large voltage margin is required (and the electricity energy consumption of the data driver 500 increases) when the luminance of the display panel 300 increases and/or the per-second frame rate of the display panel 300 increases.

When the level of the input driving voltage VLIN is not fixed but can be varied according to the luminance and the per-second frame rate of the display panel 300, the power consumption of the driving voltage supply 200 can be decreased. The decreased power consumption of the driving voltage supply 200 may be calculated by multiplying the offset voltage VLIN1_offset by electric current of the driving voltage supply 200. Table 2 shows offset voltage values according to luminance values and per-second frame rate values, electric current ranges of the driving voltage supply 200, and reduced power consumption amounts of the driving voltage supply 200.

TABLE 2

| Per-second frame rate [Hz] | Luminance [nits] | Offset voltage [V] | Current range [mA] | Reduced power consumption [mW] |
|---|---|---|---|---|
| 60 | 100 | 0.3 | 21.6~54.5 | 6.5~13.2 |
| | 650 | 0.2 | 21.6~59.4 | 4.3~10.9 |
| | 1200 | 0.1 | 30~77.4 | 2.2~5.9 |
| 90 | 650 | 0.1 | 30~85 | 3~7.8 |
| | 1200 | 0.05 | 40~110 | 1.5~4.3 |

Figure 7:
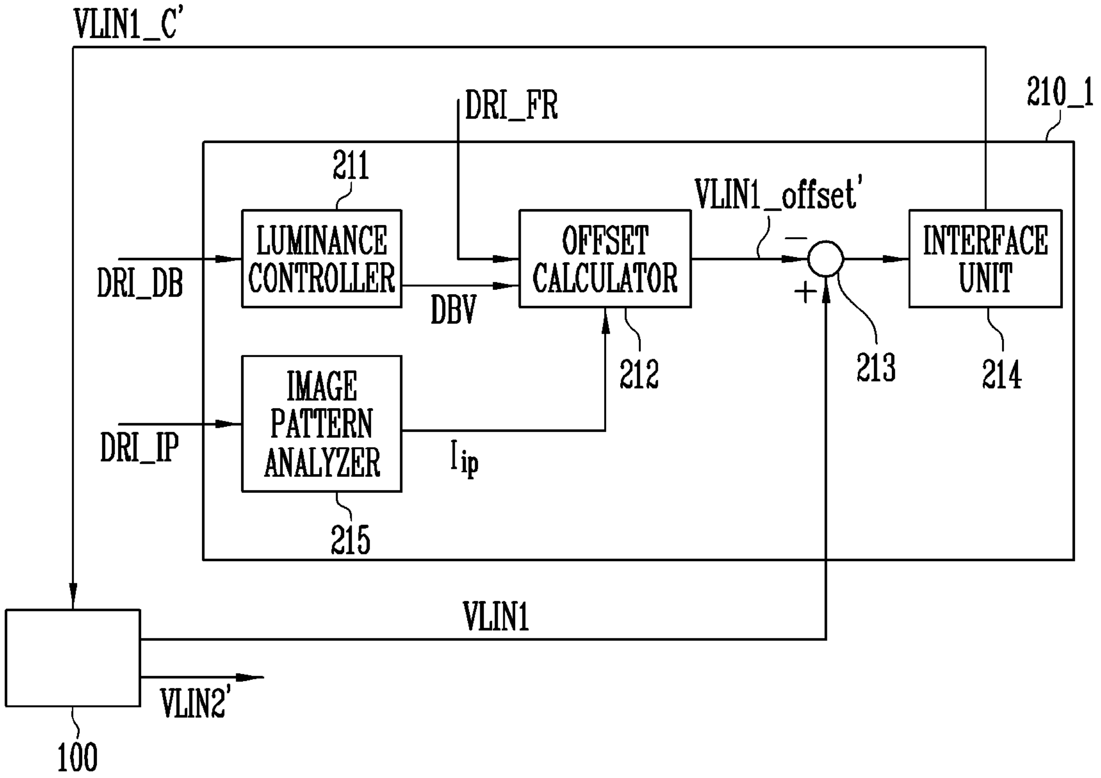
FIG. 7 is a schematic block diagram illustrating an input driving voltage corrector in accordance with an embodiment.

FIG. 7 is a schematic block diagram illustrating an input driving voltage corrector/adjuster in accordance with another embodiment. Each of FIGS. 8A and 8B is a diagram illustrating a lookup table of an input driving voltage offset calculator in accordance with an embodiment.

Referring to FIG. 7, an input driving voltage corrector 210_1 is different from the input driving voltage corrector 210 shown in FIG. 4 in that the input driving voltage corrector 210_1 further includes an image pattern analyzer 215.

In FIG. 7, a luminance controller 211, a subtractor 213, and an interface unit 214 are substantially identical to or analogous to those shown in FIG. 4.

The input driving voltage corrector 210_1 may receive driving information DRI from the timing controller 600. The driving information DRI may include luminance information DRI_DB, per-second frame rate information DRI_FR, image pattern information DRI_IP, and the like.

The image pattern analyzer 215 may receive the image pattern information DRI_IP from the timing controller 600 and may output an image pattern current value Iip of electric current consumed in the display panel 300 for each image pattern.

A load current in the input driving voltage VLN/VLIN1/VLIN2' includes components of a static current and a dynamic current. The dynamic current is a current frequently used in the data driver 500, and may vary according to a pattern of an image displayed in the display panel 300.

Table 3 shows load current values in the input driving voltage VLIN for different image patterns when the frame rate is 60 Hz and the luminance is 1200 nits. The pixel structure of the display panel 300 may be a PENTILE (TM) pixel structure. The image patterns may include a zebra pattern (1 line H-stripe), a blue pattern, and a white pattern. In the zebra pattern, white pixel rows and black pixel rows of the display panel 300 are alternately displayed. In the blue pattern, all the (available) pixels of the display panel 300 display blue. In the white pattern, all the (available) pixels of the display panel 300 display white.

Referring to Table 3, load currents of the zebra pattern, the blue pattern, and the white pattern are respectively 60 mA, 40 mA, and 22 mA, and the load current in the input driving voltage VLIN decreases in an order of the zebra pattern, the blue pattern, and the white pattern. The load current in the input driving voltage VLIN may increase as the frequency at which a pixel is turned on/off becomes larger. Therefore, the load current may be smallest for the white pattern in which all sub-pixels maintain a turn-on state, the load current for the blue pattern in which red sub-pixels are to be turned off may be larger than that for the white pattern, and the load current may be the largest for the zebra pattern in which white pixel rows and black pixel rows are alternately displayed.

TABLE 3

| Image pattern | Zebra pattern | Blue pattern | White pattern |
|---|---|---|---|
| Load current [mA] | 60 | 40 | 22 |

The offset calculator/determiner 212 may receive a luminance value DBV of the display panel 300 from the luminance controller 211, may receive per-second frame rate information DRI_FR of the display panel 300 (i.e., a per-second frame rate value) from the timing controller 600, and may receive an image pattern current value Iip from the image pattern analyzer 216. The offset calculator 212 may calculate one offset voltage VLIN1_offset' using the luminance value DBV of the display panel 300, the per-second frame rate value, and the image pattern current value Iip.

The offset calculator 212 may include a plurality of lookup tables.

Referring to FIGS. 5, 8A, and 8B, a lookup table may be established for each image pattern. For example, when the display panel 300 includes three image patterns, e.g., a zebra pattern, a blue pattern, and a white pattern, a number of lookup tables may be three. FIG. 8A is a lookup table for the blue pattern, and FIG. 8B is a lookup table for the white pattern. The above-described lookup table shown in FIG. 5 is a lookup table for the zebra pattern.

The lookup table may include a plurality of offset voltages VLIN1_offset' for determining a voltage margin of the first input driving voltage VLIN1 according to a relationship between the luminance value DBV of the display panel 300 and the per-second frame rate for each image pattern. Although the lookup tables for the zebra pattern, the blue pattern, and the white pattern are illustrated, more or fewer lookup tables for various image patterns may be established.

When the per-second frame rate is 60 Hz and the luminance is 100 nits, the offset voltages VLIN1_offset and VLIN1_offset' for the zebra pattern, the blue pattern, and the white pattern are 0.3 V, 0.325 V, and 0.35 V, respectively. That is, the offset voltages VLIN1_offset and VLIN1_offset' increase in an order of the zebra pattern, the blue pattern, and the white pattern. This configuration may decrease power consumption of the driving voltage supply 200 by increasing a voltage margin for the zebra pattern having a largest load current and decreasing a voltage marge for the white pattern having a smallest load current.

Table 4 shows load current values and reduced power consumption amounts when the same offset voltage is applied to the image patterns. Table 5 shows load current values and reduced power consumption amounts when different offset voltages are applied to the image patterns. For example, when an offset voltage of 0.1 V is applied to all the image patterns, i.e., and when the per-second frame rate is 60 Hz and the luminance is 1200 nits, the reduced power consumption amounts of the zebra pattern, the blue pattern, and the white pattern are 6 mA, 4 mA, and 2.2 mA, respectively.

When different offset voltages are applied to the image patterns, e.g., when an offset voltage VLIN1_offset of 0.1 V is applied for the zebra pattern, when an offset voltage VLIN1_offset' of 0.2 V is applied for the blue pattern, and when an offset voltage VLIN1_offset' of 0.215 V is applied for the white pattern, the reduced power consumption amounts of the zebra pattern, the blue pattern, and the white pattern are 6 mA, 8 mA, and 4.95 mA, respectively.

As can be appreciated from Table 4 and Table 5, when different offset voltages are applied to the image patterns, the reduced power consumption of the driving voltage supply 200 can be further decreased than that when the same offset voltage is applied to all the image patterns.

TABLE 4

| Image pattern | Zebra pattern | Blue pattern | White pattern |
|---|---|---|---|
| Load current [mA] | 60 | 40 | 22 |
| Offset voltage [V] | | 0.1 | |
| Reduced power consumption [mW] | 6 | 4 | 2.2 |

TABLE 5

| Image pattern | Zebra pattern | Blue pattern | White pattern |
|---|---|---|---|
| Load current [mA] | 60 | 40 | 22 |
| Offset voltage [V] | 0.1 | 0.2 | 0.215 |
| Reduced power consumption [mW] | 6 | 8 | 4.95 |

The subtractor 213 may receive an offset voltage VLIN1_offset' from the offset calculator 212 and may receive a first input driving voltage VLIN1 from the power supply 100. The subtractor 213 may generate a corrected/adjusted voltage value VLIN1_C' by subtracting the offset value VLIN1_offset' from the first input driving voltage VLIN1.

The interface unit 214 may receive the corrected voltage value VLIN1_C' from the subtractor 213 and may provide the corrected voltage value VLIN1_C' to the power supply 100.

The power supply 100 may output a second input driving voltage VLIN2' using the corrected voltage value VLIN1_C'. The second input driving voltage VLIN2' may be a function of the corrected voltage value VLIN1_C'. The second input driving voltage VLIN2' may be equal to the corrected/adjusted voltage value VLIN1_C, i.e., VLIN2'=VLIN1_C'=VLIN1−VLIN1_offset'. The regulators 220 may regulate the second input driving voltage VLIN2' to generate driving voltages respectively suitable for the display panel 300, the scan driver 400, the data driver 500, and the like.

Figure 9:
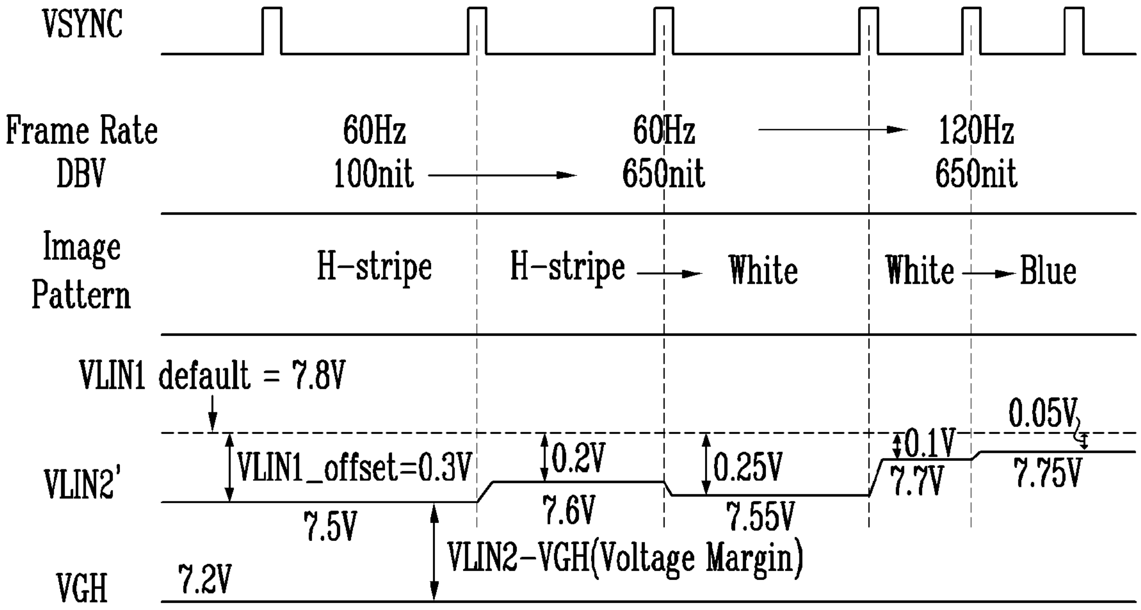
FIG. 9 is a diagram illustrating an operation of a display device in accordance with an embodiment.

FIG. 9 is a diagram illustrating an operation of the display device in accordance with an embodiment. When a per-second frame rate, a luminance, and an image pattern all vary, an offset voltage VLIN1_offset' also varies according to the per-second frame rate, the luminance, and the image pattern. A lookup table for each image pattern may include a plurality of offset voltages VLIN1_offset'.

Referring to FIGS. 5, 8A, 8B, and 9, when an image pattern varies in a condition of the same per-second frame rate and the same luminance, the offset voltage VLIN1_offset' varies according to the image pattern. For example, when the image pattern is changed from the zebra pattern to the white pattern when the per-second frame rate is maintained at 60 Hz and the luminance is maintained at 650 nits, the offset voltage VLIN1_offset' may be changed from 0.2 V to 0.25 V. In other words, when the image pattern is changed from the zebra pattern to the white pattern, the second input driving voltage VLIN2' may be changed from 7.6 V to 7.55. That is, with the same per-second frame rate and the same luminance, the voltage margin is increased for the zebra pattern (having a large load current) and is decreased for the white pattern (having a relatively load current). Consequently, the power consumption of the driving voltage supply 200 can be further decreased. Analogously, the voltage margin can be adjusted for other condition changes to minimize the power consumption of the driving voltage supply 200.

In accordance with embodiments, a driving voltage supply and/or a display device can minimize power consumption by varying a driving voltage according to an increase/decrease of a load current of a display panel.

Example embodiments have been described. Features described in connection with a particular embodiment may be used singly or in combination with other embodiments. Various changes to the example embodiments may be made without departing from the scope set forth in the following claims.

What is claimed is:

1. A display device comprising:

a display panel comprising pixels;

a data driver, which is electrically connected to the pixels and supplies data signals to the pixels;

a driving voltage supply, which is electrically connected to the data driver and supplies a first driving voltage to the data driver;

a power supply, which is electrically connected to the driving voltage supply and supplies a first input driving voltage to the driving voltage supply; and a timing controller, which provides control signals for respectively controlling the data driver, the driving voltage supply, and the power supply and provides the driving voltage supply with luminance information and per-second frame rate information of the display panel, wherein the driving voltage supply comprises an input driving voltage adjuster, which is electrically connected to the timing controller, determines an offset voltage based on the luminance information and the per-second frame rate information of the display panel, and uses the first input driving voltage and the offset voltage to generate a second input driving voltage, wherein the first input driving voltage is a highest voltage output from the power supply, and wherein the driving voltage supply divides the second input driving voltage to generate a first power voltage and a second power voltage required for an operation of the pixels, and supplies the first power voltage and the second power voltage to the display panel.

2. The display device of claim 1, wherein the input driving voltage adjuster decreases a voltage level of the offset voltage when at least one of a luminance value of the display panel and a per-second frame rate of the display panel increases.

3. The display device of claim 2, wherein the input driving voltage adjuster comprises:

a luminance controller, which outputs the luminance value of the display panel based on the luminance information of the display panel;

an offset determiner, which determines the offset voltage based on the luminance value of the display panel and the per-second frame rate of the display panel; and a subtractor, which subtracts the offset voltage from the first input driving voltage to generate at least one of an adjusted input driving voltage and the second input driving voltage.

4. The display device of claim 3, wherein the input driving voltage adjuster further includes an interface unit electrically connected to the power supply for communicating with the power supply, and wherein the interface unit includes at least one of an inter-integrated circuit and a single wire.

5. The display device of claim 3, wherein the offset determiner comprises a first lookup table, and wherein the first lookup table comprises first-set values for the offset voltage corresponding to possible values of the luminance value of the display panel and corresponding to possible values of the per-second frame rate of the display panel.

6. The display device of claim 5, wherein according to the first lookup table, for a same possible value of the luminance value, a first first-set value for the offset voltage corresponds to a first possible value of the per-second frame rate, and a second first-set value for the offset voltage lower than the first first-set value for the offset voltage corresponds to a second possible value of the per-second frame rate higher than the first possible value of the per-second frame rate, and wherein according to the first lookup table, for a same possible value of the per-second frame rate, a third first-set value for the offset voltage corresponds to a first possible value of the luminance value, and a fourth first-set value for the offset voltage lower than the third first-set value for the offset voltage corresponds to a second possible value of the luminance value higher than the first possible value of the luminance value.

7. The display device of claim 3, wherein the timing controller further provides image pattern information of the display panel to the driving voltage supply.

8. The display device of claim 7, wherein the image pattern information indicates a zebra pattern when pixel rows of the display panel alternately display white and black, wherein the image pattern information indicates a blue pattern when all available pixels of the display panel display blue, and wherein the image pattern information indicates a white pattern when all the available pixels of the display panel display white.

9. The display device of claim 8, wherein the input driving voltage adjuster further comprises an image pattern analyzer, which outputs an image pattern current value of a current consumed in the display panel based on the image pattern information of the display panel.

10. The display device of claim 9, wherein the offset determiner uses a first lookup table to determine the offset voltage when the image pattern information indicates a first image pattern, wherein the offset determiner further comprises a second lookup table and uses the second lookup table to determine the offset voltage when the image pattern information indicates a second image pattern, wherein the first image pattern and the second image pattern are different two of the zebra pattern, the blue pattern, and the white pattern, and wherein the second lookup table comprises second-set values for the offset voltage corresponding to possible values of the luminance value and corresponding to possible values of the per-second frame rate.

11. The display device of claim 10, wherein according to the second lookup table, for a same possible value of the luminance value, a first second-set value for the offset voltage corresponds to a first possible value of the per-second frame rate, and a second second-set value for the offset voltage lower than the first second-set value for the offset voltage corresponds to a second possible value of the per-second frame rate higher than the first possible value of the per-second frame rate, and wherein according to the second lookup table, for a same possible value of the per-second frame rate, a third second-set value for the offset voltage corresponds to a first possible value of the luminance value, and a fourth second-set value for the offset voltage lower than the third second-set value for the offset voltage corresponds to a second possible value of the luminance value higher than the first possible value of the luminance value.

12. The display device of claim 10, wherein the first image pattern is the zebra pattern or the blue pattern, wherein the second image pattern is the blue pattern or the white pattern, wherein a first first-set value and a second first-set value for the offset voltage are respectively lower than the first second-set value and the second second-set value for the offset voltage, and wherein a third first-set value and a fourth first-set value for the offset voltage are respectively lower than the third second-set value and the fourth second-set value for the offset voltage.

13. The display device of claim 1, wherein the driving voltage supply further comprises regulators, which receive the second input driving voltage and generate the first driving voltage by dividing the second input driving voltage.

14. The display device of claim 13, wherein the regulators are low-dropout regulators.

15. The display device of claim 13, wherein the first driving voltage comprises a first gamma voltage as a highest gamma voltage for the display panel and comprises a second gamma voltage as a lowest gamma voltage for the display panel.

16. The display device of claim 15, wherein the data driver comprises a gamma block, which receives the first gamma voltage and the second gamma voltage and generates gamma voltages by dividing the first gamma voltage and the second gamma voltage.

17. The display device of claim 13, further comprising a scan driver, which supplies scan signals to the pixels.

18. The display device of claim 17, wherein the regulators generate a second driving voltage by dividing the second input driving voltage and provide the second driving voltage to the scan driver.

19. The display device of claim 18, wherein the second driving voltage comprises a high DC voltage and a low DC voltage, which are used when the pixels are turned on or turned off.

20. The display device of claim 1, wherein the power supply further comprises a boost DC-DC converter, which receives an external power voltage and boosts the external power voltage to the first input driving voltage having a level higher than that of the external power voltage.

* * * * *